(12) United States Patent
Igawa

(10) Patent No.: US 6,186,544 B1
(45) Date of Patent: Feb. 13, 2001

(54) AIR BAG FOR PASSENGER AND FOLDING METHOD THEREOF

(75) Inventor: Tadahiro Igawa, Shiga (JP)

(73) Assignee: Takata Corporation, Tokyo (JP)

( * ) Notice: Under 35 U.S.C. 154(b), the term of this patent shall be extended for 0 days.

(21) Appl. No.: 09/286,293

(22) Filed: Apr. 6, 1999

(30) Foreign Application Priority Data

Apr. 8, 1998 (JP) ................................................. 10-111368

(51) Int. Cl.⁷ .................................................. B60R 21/20
(52) U.S. Cl. ...................................... 280/743.1; 280/732
(58) Field of Search ................................. 280/732, 743.1

(56) References Cited

U.S. PATENT DOCUMENTS

| | | | | |
|---|---|---|---|---|
| 4,169,613 | * | 10/1979 | Barnett ................................. | 280/732 |
| 5,240,282 | | 8/1993 | Wehner et al. .................... | 280/728.2 |
| 5,348,341 | * | 9/1994 | Webber ................................ | 280/732 |
| 5,538,281 | | 7/1996 | Patercsak .......................... | 280/743.1 |
| 5,636,861 | * | 6/1997 | Orsulak et al. ..................... | 280/732 |
| 5,873,598 | * | 2/1999 | Yoshioka et al. .................... | 280/732 |
| 5,884,939 | * | 3/1999 | Yamaji et al. ........................ | 280/732 |

OTHER PUBLICATIONS

Patent Abstracts of Japan, vol. 018, No. 653 (M–1720), Dec. 12, 1994 & JP 06 255437 A (Takata KK; Others: 01), Sep. 13, 1994.

Patent Abstracts of Japan, vol. 018, No. 653 (M–1720), Dec. 12, 1994 & JP 06 255438 A (Takata KK; Others: 01), Sep. 13, 1994.

Patent Abstracts of Japan, vol. 098, No. 001 Jan. 30, 1998 & JP 09 226497 A (Toyo Tire & Amp; Rubber Co Ltd; Toyota Motor Corp), Sep. 2, 1997.

Patent Abstracts of Japan, vol. 018, No. 544 (M–1688), Oct. 18, 1994 & JP 06 191362 A (Toyo Tire & Rubber Co Ltd), Jul. 12, 1994.

* cited by examiner

*Primary Examiner*—Kenneth R. Rice
(74) *Attorney, Agent, or Firm*—Kanesaka & Takeuchi

(57) ABSTRACT

An air bag for a front passenger is provided with a loose portion on a windshield side, and after the loose portion is formed, edges of the air bag on the opposite side of the windshield are folded in concavities formed behind the loose portion. Then, the air bag is folded toward the passenger side. Therefore, the air bag starts to deploy from a part on the windshield side to provide suitable deployment to securely restrain an occupant. The air bag can be deployed smoothly, and prevent undesired pressure on the windshield without increasing the cost.

4 Claims, 5 Drawing Sheets

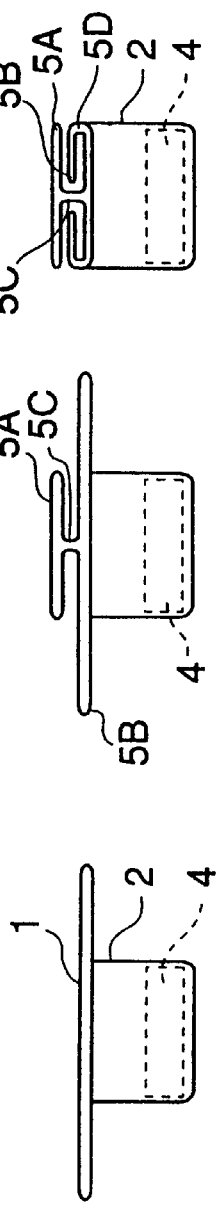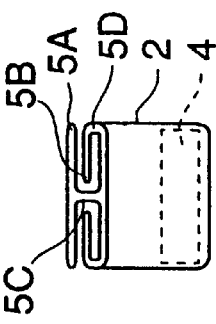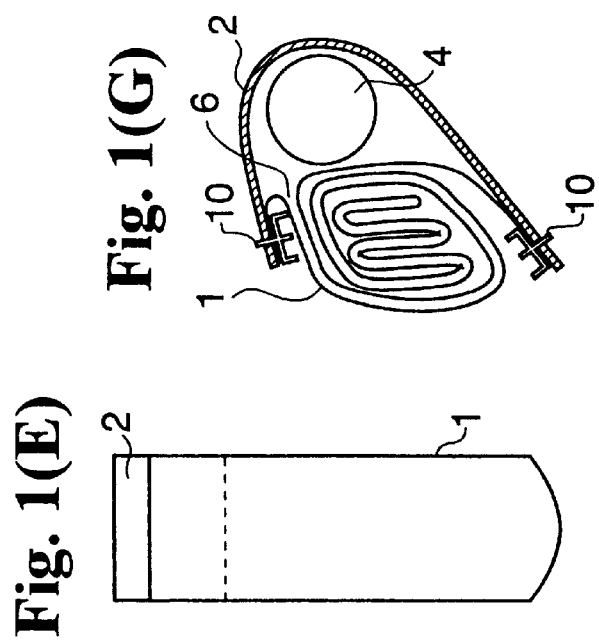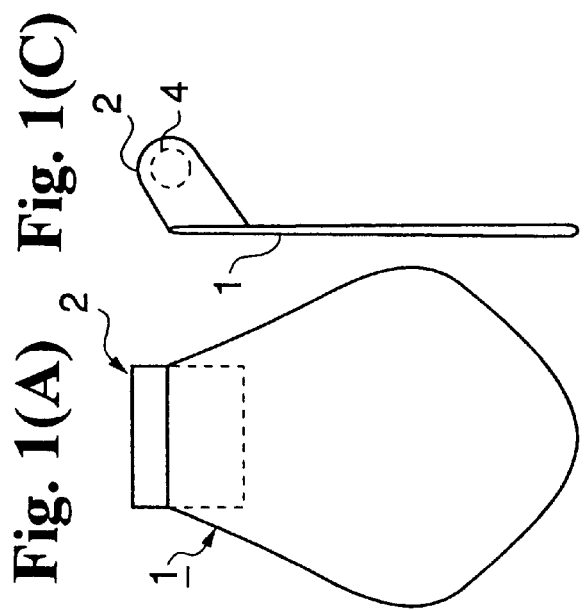

AIR BAG FOR PASSENGER AND FOLDING METHOD THEREOF

BACKGROUND OF THE INVENTION AND RELATED ART STATEMENT

The present invention relates to a method of folding an air bag which is deployed to protect an occupant in the event of vehicle emergency, and the air bag thereof. More particularly, the present invention relates to a method of folding an air bag which can provide suitable deployment to securely restrain an occupant and which is improved in smooth deployment.

There are various methods generally employed for folding an air bag. FIG. 7 is a sectional view of an air bag for a front passenger (hereinafter, referred to as "passenger air bag") which is folded in one of conventional folding methods. In FIG. 7, right and left side edges 11 of the air bag 1 are folded in bellows. The air bag 1 is folded to have a width corresponding to the width of an air bag case 2 so that the air bag 1 can be accommodated in the air bag case 2.

Also, there is a passenger air bag, which is deployed, at first, toward an upper portion of an instrument panel, and then, extends toward an upper side of an occupant in a front passenger seat.

FIGS. 8(A) and 8(B) show that a passenger air bag which has been folded in a conventional method is being deployed. FIG. 8(A) is a side sectional view, and FIG. 8(B) is a sectional view taken along line 8(B)—8(B) in FIG. 8(A).

Referring to FIGS. 8(A) and 8(B), as an inflator 4 disposed in the air bag case 2 generates gas and the gas enters into the air bag 1 as shown by arrows, an air bag cover 9 arranged on an instrument panel 8 is broken by the inner pressure of the air bag 1, so that the air bag 1 is deployed above the instrument panel 8.

In this state, as shown in FIG. 8(B), an upper portion 1a of the air bag 1, which is positioned near a windshield glass 3 (hereinafter, referred to as "windshield" or "glass"), strikes the windshield 3 when the upper portion 1a is still in the folded state.

In the passenger air bag folded in the conventional method, it can not be predicted how the deploying air bag 1 strikes the windshield 3, so that there is a possibility that the glass is subjected to undesired local pressure. In order to prevent undesired local pressure on the glass, various measures have been taken, for example, reducing the output of the inflator, adjusting the mount position of the air bag 1 and/or the angle for mounting the air bag case 2, and increasing the strength of the windshield 3. These measures impair the working efficiency of assembling the passenger air bag and increase the cost.

It is, therefore, desired to provide improved folding methods.

The present invention has been made to solve the above problem, and an object of the invention is to provide a method of folding a passenger air bag, which can provide suitable deployment to securely restrain an occupant and which is improved in smooth deployment.

Another object of the invention is to provide a passenger air bag, which can provide suitable and smooth deployment.

Further objects and advantages of the invention will be apparent from the following description of the invention.

SUMMARY OF THE INVENTION

In order to solve the above-described problems, the first aspect of the present invention is to provide an air bag to be deployed in front of a front passenger seat, wherein the air bag is folded in such a manner to apply resistance against deployment on the opposite side of a windshield, i.e. passenger side, so that the windshield side is deployed prior to the passenger side.

Accordingly, the air bag starts to deploy from the windshield side and the windshield is struck by a portion of the air bag, which has been inflated by releasing the folding, thereby dispersing and thus reducing the pressure on the windshield.

The second aspect of the present invention is to provide a method of folding an air bag to be deployed in front of a front passenger seat, wherein the number of rolled or folded portions of the air bag on the opposite side of the windshield is larger than that of rolled or folded portions on the windshield side.

Because the larger number of the rolled or folded portions are formed on the passenger side, the air bag starts to deploy from a part of the windshield side, and the rolled or folded portions of the air bag are prevented from being directed toward the windshield directly.

The third aspect of the present invention is to provide a method of folding an air bag to be deployed in front of a front passenger seat, comprising: forming a loose portion at the center of the air bag on the windshield side in the lateral direction; folding or rolling up right and left edges of the air bag toward the center thereof on the opposite side of the windshield, i.e. passenger side; and folding or rolling up a tip of the air bag to the passenger side.

Since the loose portion is formed at the center in the lateral direction on the windshield side, and the right and left edges are folded or rolled toward the center on the passenger side, gas is likely to flow into the loose portion on the windshield side during its deployment, so that the air bag starts to deploy from the windshield side. Further, the windshield is struck by the portion of the air bag, which is sufficiently inflated by releasing the folding, thereby reducing the pressure on the windshield. Since the tip of the air bag is folded or rolled up to the passenger side, the folded or rolled portion of the air bag is prevented from being directed toward the windshield directly during the deployment of the air bag.

BRIEF DESCRIPTION OF THE DRAWINGS

FIGS. 1(A)–1(G) are explanatory views illustrating a folding process according to a method of folding an air bag of one embodiment of the present invention;

DETAILED DESCRIPTION OF PREFERRED EMBODIMENTS

Figure 2:
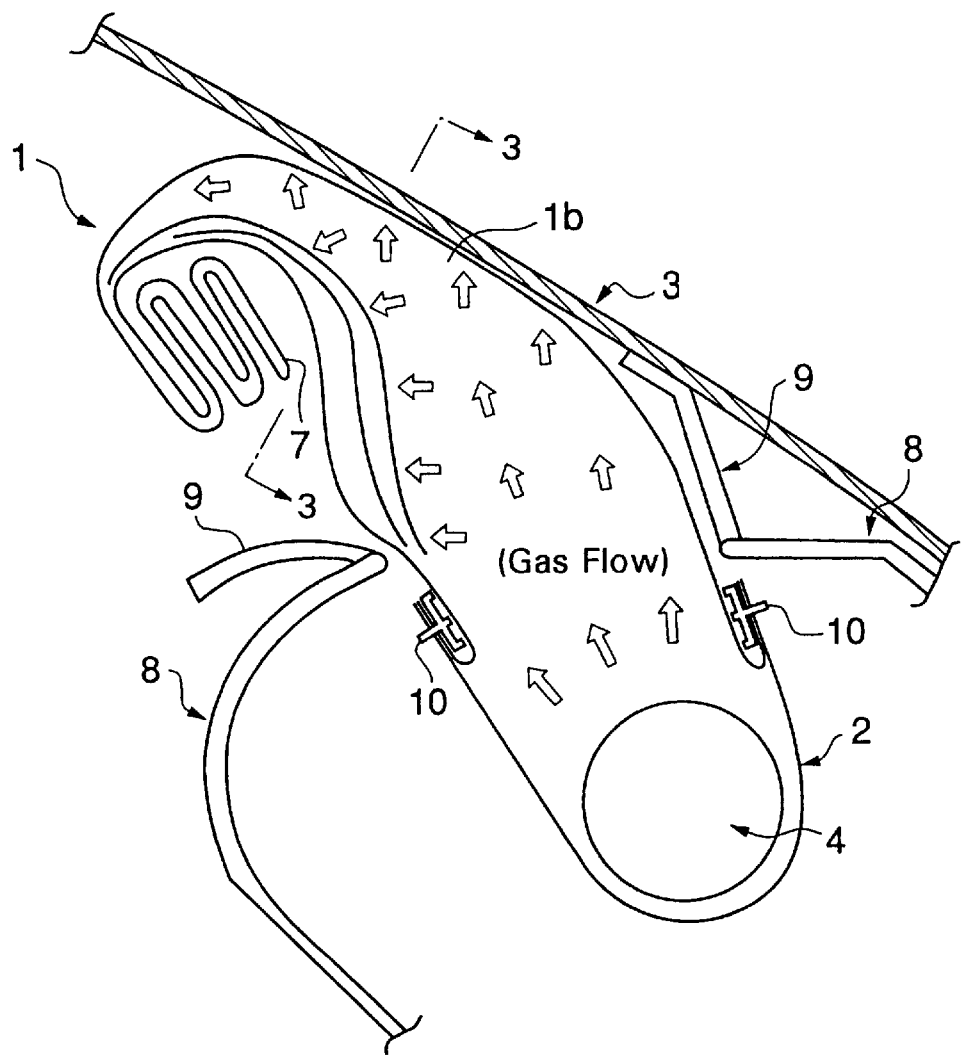
FIG. 2 is an explanatory sectional view showing the structure of the air bag shown in FIGS. 1(A)–1(G) at a deployment.

Hereinafter, the present invention will be described with reference to attached drawings.

FIGS. 1(A) through 1(G) are views illustrating a process of folding a passenger air bag 1, according to one embodiment of the present invention. FIG. 1(A) is a plan view of the air bag 1 from the upper side; FIG. 1(B) is a front view of the air bag 1 from a side opposite to a windshield, i.e. passenger side; FIG. 1(C) is a side view of the air bag 1 from a lateral side thereof. In these drawings, the air bag 1 has not been folded and spreads laterally, and the air bag 1 is formed in a tongue-like shape in its plan view. The end of the air bag 1 positioned near the windshield, i.e. upper side in FIGS. 1(A) and 1(C), is fixed to an air bag case 2 to be installed in an instrument panel. Arranged with the air bag case 2 is an inflator 4 for generating a gas to deploy the air bag 1.

FIG. 1(D) is a front view from the side opposite to the windshield, i.e. passenger side, illustrating a first stage of the folding process. In the first stage of the folding process, an upper portion of the air bag 1 located about the center in the lateral direction thereof is picked up to form a loose portion 5A to thereby form concavities 5C beneath the loose portion 5A. In this state, side edges 5B of the air bag 1 are therefore moved slightly toward the center. The loose portion 5A on the windshield side (upper side in the drawing) has a width to be accommodated in the air bag case 2. The width of the loose portion 5A is set to be nearly equal to the inner width of the air bag case 2. On the other hand, the width a main portion between the edges 5B of the air bag 1 on the passenger (lower side in the drawing) is lager than the width of the loose portion 5A.

FIGS. 1(E) and 1(F) illustrate the second stage of the folding process, wherein FIG. 1(E) is a plan view of the air bag 1 from the upper side, and FIG. 1(F) is a front view of the air bag 1 from the opposite side of the windshield. As shown in FIGS. 1(E) and 1(F), the edges 5B of the air bag 1 are folded to enter the concavities 5C formed beneath the loose portion 5A. That is, the edges 5B are folded by being directed toward the inside of the concavities 5C to form folded portions 5D, respectively, on the opposite side of the windshield. The width formed by the folded portions 5D may be equal to or smaller that the width of the loose portion 5A. It should be noted that the edges 5B may be folded in plural times.

An operation of folding the edges 5B on the opposite side of the windshield or passenger side (lower side in the drawing) into the concavities 5C of the loose portion 5A are as follows. During the deployment of the air bag 1, fluid resistance caused by a gas flowing into the edges 5B on the passenger side is greater than the fluid resistance caused by the gas flowing into the loose portion 5A on the windshield side. This is because the distance from the inflator to the edges 5B is longer than the distance from the inflator to the right and left ends of the loose portion 5A, and further the fluid resistance of the gas flow is increased by the folded portions 5D. Therefore, the gas flows into the loose portion 5A prior to flowing into the edges 5B, so that the air bag 1 starts to deploy at the loose portion 5A on the windshield side. Since this feature of the deployment can be emphasized by making the fluid resistance of the gas flowing into the edges 5B on the passenger side (lower side in the drawings) greater than that of the gas flowing into the loose portion 5A on the windshield side, if the loose portion 5A is folded, the number of folding for the edges 5B may be increased to be greater than the number of folding of the loose portion 5A.

FIG. 1(G) is a side view of the air bag 1 taken from the lateral side thereof, illustrating the third stage of the folding process. The upper side in FIG. 1(G) is the side near the windshield and the left side in FIG. 1(G) is the upper side in the direction opposite to the gravity. As shown in FIG. 1(G), in the third stage of the folding process, a tip portion of the air bag 1 is folded several times (four times in the drawing) in bellows. Thereafter, the bellow-like portion thus formed is wrapped in such a manner that the end of the wrapping is position on the windshield side (upper side in the drawing), and is, then, accommodated in the air bag case 2. The accommodation of the air bag 1 in the air bag case 2 using the wrapping method as mentioned above allows an inlet 6 for leading the gas generated by the inflator 4 to flow into the air bag 1 on the windshield side.

The air bag 1 is fixed to the inside of an opening of the air bag case 2 by fittings 10. The fittings 10 not only fix the air bag 1, but also seal the inside of the air bag 1 and the inside of the air bag case 2.

The description will now be made as regard to the configurations of the passenger air bag, which has been folded as shown in FIGS. 1(A)–1(G), during its deployment. FIG. 2 is a view showing the configuration of the passenger air bag in its deployment stage, and FIG. 3 is a sectional view taken along line 3—3 in FIG. 2.

Figure 3:
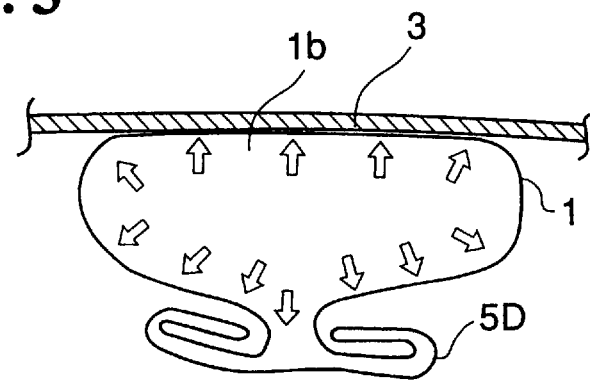
FIG. 3 is a sectional view of the air bag taken along line 3—3 in FIG. 2.

In FIGS. 2 and 3, as the gas generated from the inflator 4 arranged in the air bag case 2 flows into the air bag 1 as shown by arrows in the drawings, the air bag cover 9 is broken by the inner pressure of the air bag 1, so that the air bag 1 is deployed above the instrument panel 8. Since the gas is likely to flow into the loose portion 5A in FIG. 1(D) at the windshield side along a gas path because of the lower fluid resistance than that of the folded portions 5D, when the air bag 1 comes to contact with the windshield, a contact portion 1b has been already deployed by releasing the foldings. On the other hand, the folded portion or core 7 at the tip of the bag 1, in which still no or little gas enters, is deployed with some time delay from the deployment on the windshield side because the folded portion 7 has been folded and rolled up as mentioned with regard to FIG. 1(G). This prevents the core 7 from directly striking the windshield 3. Therefore, the pressure exerted on the windshield 3 by the air bag 1 is reduced, and the strike by the core 7 is prevented, thereby avoiding the undesired pressure on the windshield 3.

Hereinafter, variations of the folding method of the embodiment shown in FIGS. 1(A)–1(G) will now be described.

Figure 4:
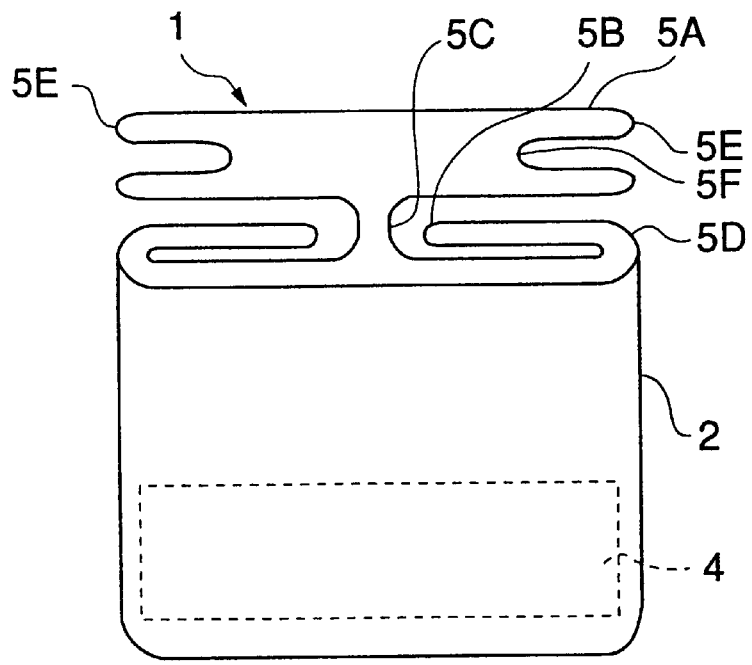
FIG. 4 is a front view showing a variation of a method of folding the air bag of the embodiment shown in FIGS. 1(A)–1(G)
Figure 5:
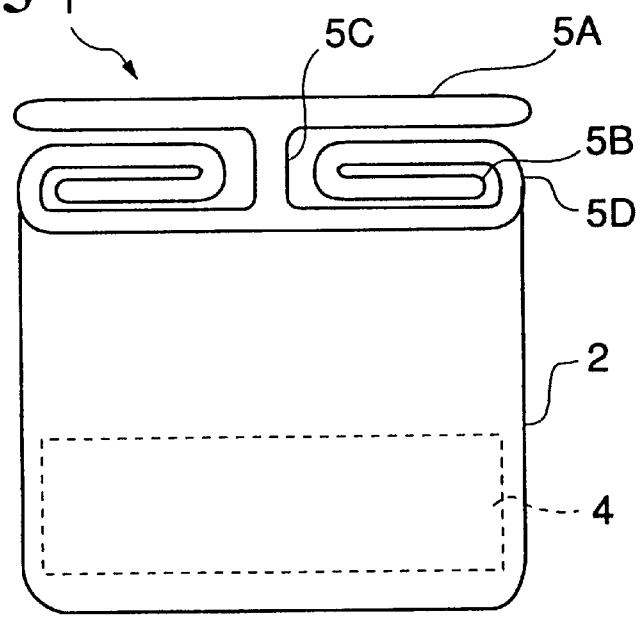
FIG. 5 is a front view showing another variation of a method of folding the air bag of the embodiment shown in FIGS. 1(A)–1(G)
Figure 6:
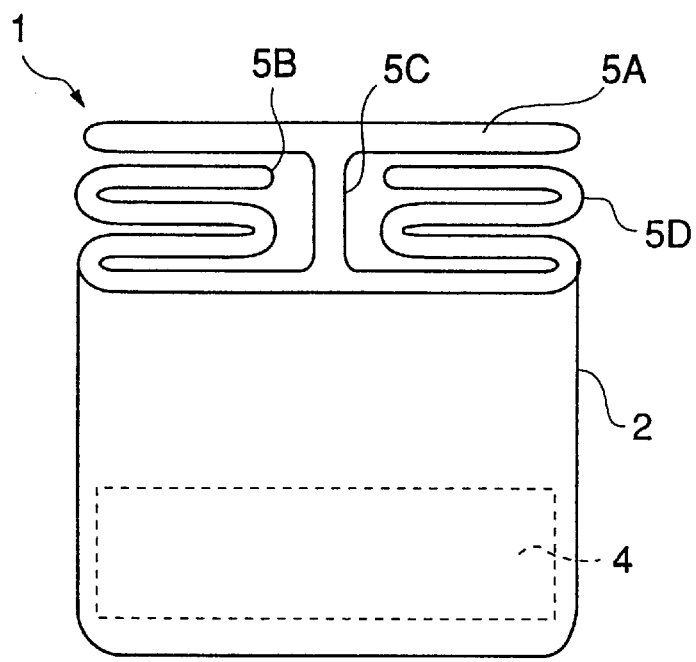
FIG. 6 is a front view showing a further variation of a method of folding the air bag of the embodiment shown in FIGS. 1(A)–1(G)
Figure 7:
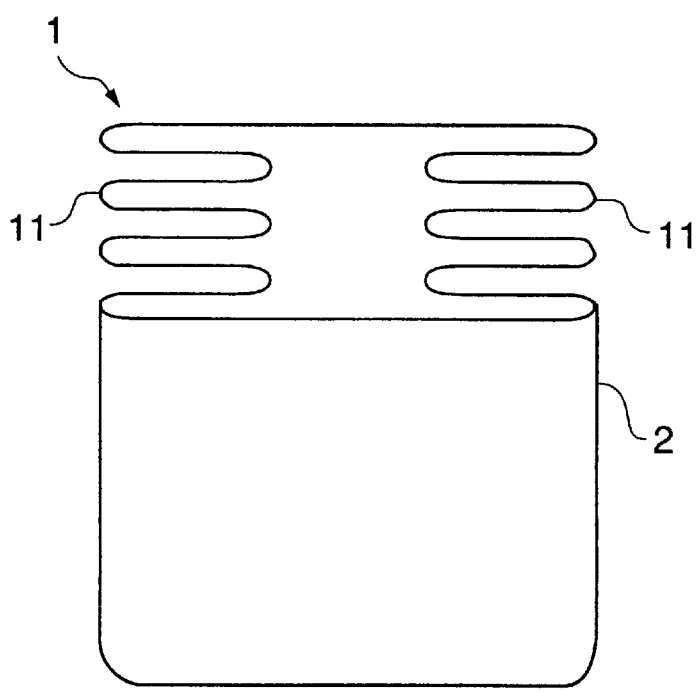
FIG. 7 shows a sectional view of a passenger air bag which is folded in a conventional method.
Figure 8A:
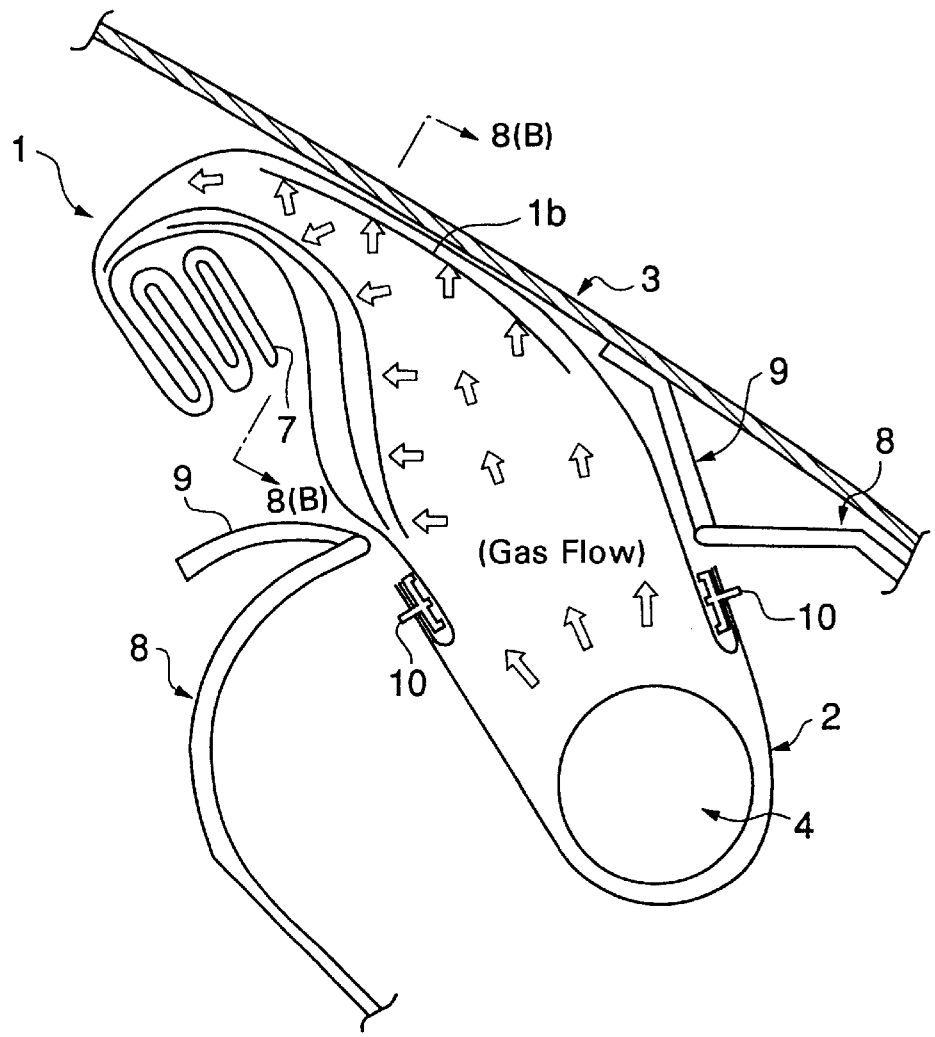
FIG. 8(A) shows an explanatory sectional view of a passenger air bag, which is folded in the conventional method, at deployment of the air bag.
Figure 8B:
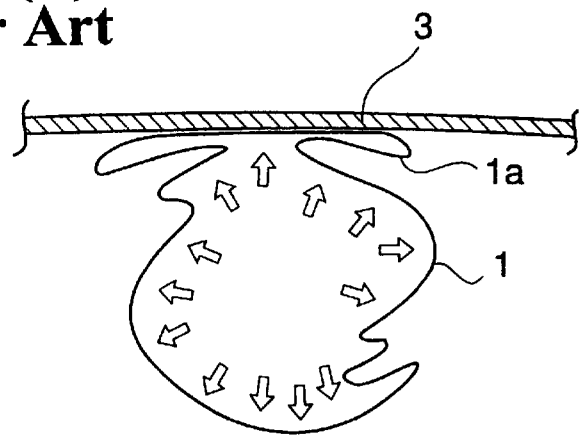
FIG. 8(B) is a sectional view taken along line 8(B)—8(B) in FIG. 8(A).

FIG. 4 through 6 show variations of the folding method of the embodiment shown in FIGS. 1(A)–1(G), each showing a variation in the second stage, similar to FIG. 1(F). Though the loose portion 5A is formed by picking up the upper portion of the air bag 1 about the center in the lateral direction thereof in such a manner that the loose portion 5A has a width to be accommodated in the air bag case 2 in the embodiment shown in FIGS. 1(A)–1(G), the width of the loosen portion 5A can be adjusted by forming recesses 5F on both side portions 5E as shown in FIG. 4.

As shown in FIG. 5, the edges 5B may be rolled up into the concavities 5C, 5C. As shown in FIG. 6, further, the edges 5B may be folded in plural times in the concavities 5C.

As mentioned above, in the passenger air bag and the folding method thereof according to this embodiment, the number of rolled or folded portions of the air bag on the opposite side of the windshield is larger than that on the windshield side, so that the air bag starts to deploy from the windshield side and the rolled or folded portions of the air bag are prevented from being directed toward the windshield directly.

The air bag is provided with a loose portion at the center thereof in the lateral direction on the windshield side, and the right and left edges on the opposite side of the windshield are folded or rolled toward the center, so that the gas is likely to flow into the loosen portion on the windshield side during its deployment. Therefore, the air bag starts to deploy from the windshield side and the windshield is struck by the portion of the air bag, which is inflated by releasing the foldings, thereby reducing the pressure struck on the windshield. The right and left edges are folded or rolled up on the opposite side of the windshield, thereby preventing the folded or rolled portions of the air bag from being directed toward the windshield directly during the deployment of the air bag.

The application of undesired local pressure on the windshield by the deployment of the air bag can be prevented, thereby relieving measures which have been taken, for example, reducing the output of the inflator, adjusting the mount position of the air bag and/or the angle for mounting the air bag case, and increasing the strength of the windshield.

As apparent from the above description, the present invention can provide a passenger air bag which can provide suitable deployment to securely restrain an occupant, which is improved in smooth deployment, and which can prevent undesired pressure on a glass without increasing the cost, and to provide a folding method used therefor.

While the invention has been explained with reference to the specific embodiments of the invention, the explanation is illustrative and the invention is limited only by the appended claims.

What is claimed is:

1. A method of folding an air bag to be deployed in front of a front passenger seat, comprising:

placing an air bag in a plane so that an inlet is located at one side of a rear portion of the air bag to extend laterally, forming a loose portion at a center of a front portion of the air bag on a windshield side, said loose portion having a width substantially corresponding to a width of an air bag case to be disposed and extending perpendicularly to an extending direction of the inlet from a portion near the opening of the air bag to a tip portion of the air bag away from the opening, and concavities behind the loose portion on two lateral sides of the loose portion to thereby place a main portion under the loose portion, folding right and left edges of the main portion of the air bag toward the center of the air bag along the loose portion to be placed in the concavities so that the main portion after the right and left edges are folded has a width substantially same as the width of the loose portion and is located under the loose portion, and folding the tip portion of the air bag to the passenger side so that when the air bag is deployed, the loose portion of the air bag at the windshield side is deployed from the portion near the opening to the tip portion to thereby reduce a striking force of the air bag against the windshield.

2. A method of folding an air bag according to claim 1, wherein said folding the right and left edges of the air bag and said folding the tip portion of the air bag include rolling the edges and tip portion of the air bag.

3. A method of folding an air bag according to claim 1, wherein said loose portion includes lateral recesses extending toward the center of the air bag on two sides along the loose portion.

4. A folded air bag to be deployed in front of a front passenger seat formed by steps comprising:

placing an air bag in a plane so that an inlet is located at one side of a rear portion of the air bag to extend laterally, forming a loose portion at a center of a front portion of the air bag on a windshield side, said loose portion having a width substantially corresponding to a width of an air bag case to be disposed and extending perpendicularly to an extending direction of the inlet from a portion near the opening of the air bag to a tip portion of the air bag away from the opening, and concavities behind the loose portion on two lateral sides of the loose portion to thereby place a main portion under the loose portion, folding right and left edges of the main portion of the air bag toward the center of the air bag along the loose portion to be placed in the concavities so that the main portion after the right and left edges are folded has a width substantially same as the width of the loose portion and is located under the loose portion, and folding the tip portion of the air bag to the passenger side so that when the air bag is deployed, the loose portion of the air bag at the windshield side is deployed from the portion near the opening to the tip portion to thereby reduce a striking force of the air bag against the windshield.

* * * * *